April 9, 1968         P. MISZAK         3,376,859
PIPE LINING FOR A STEAM GENERATOR
Filed Sept. 27, 1966         3 Sheets-Sheet 1
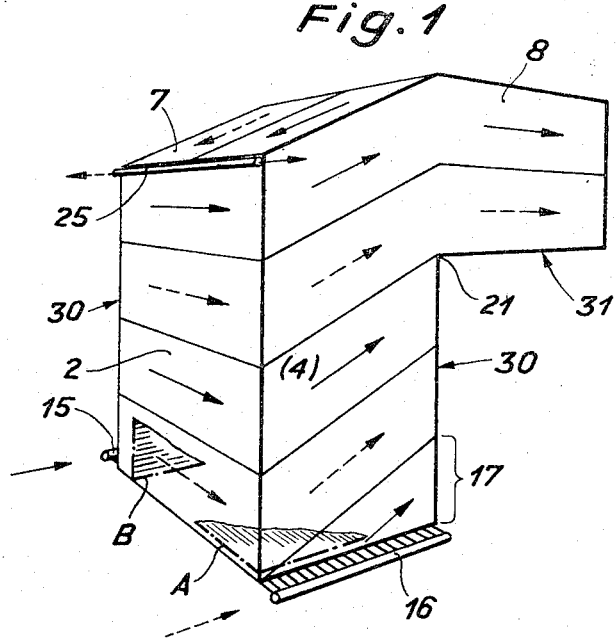
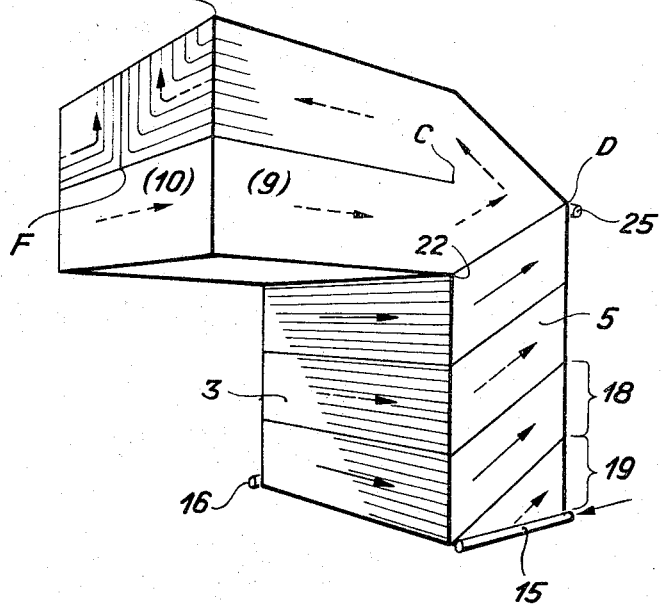
Inventor:
PAWEL MISZAK
BY Kenyon & Kenyon
ATTORNEYS April 9, 1968   P. MISZAK   3,376,859
PIPE LINING FOR A STEAM GENERATOR
Filed Sept. 27, 1966   3 Sheets-Sheet 2
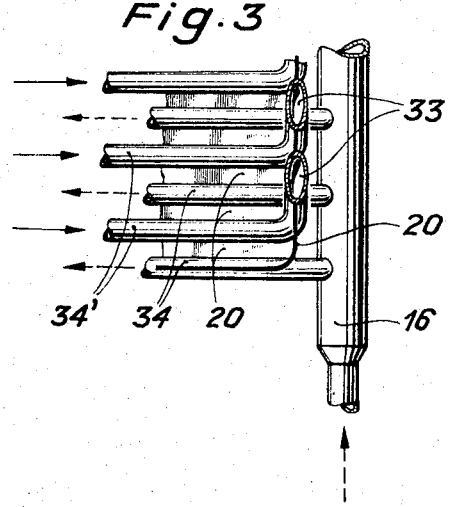
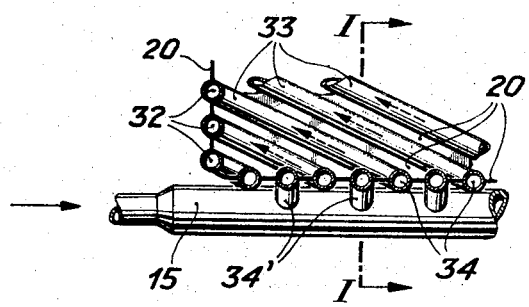
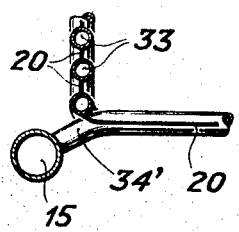
Inventor·
PAWEL MISZAK
BY
Kenyon & Kenyon
ATTORNEYS April 9, 1968  P. MISZAK  3,376,859
PIPE LINING FOR A STEAM GENERATOR
Filed Sept. 27, 1966  3 Sheets-Sheet 3
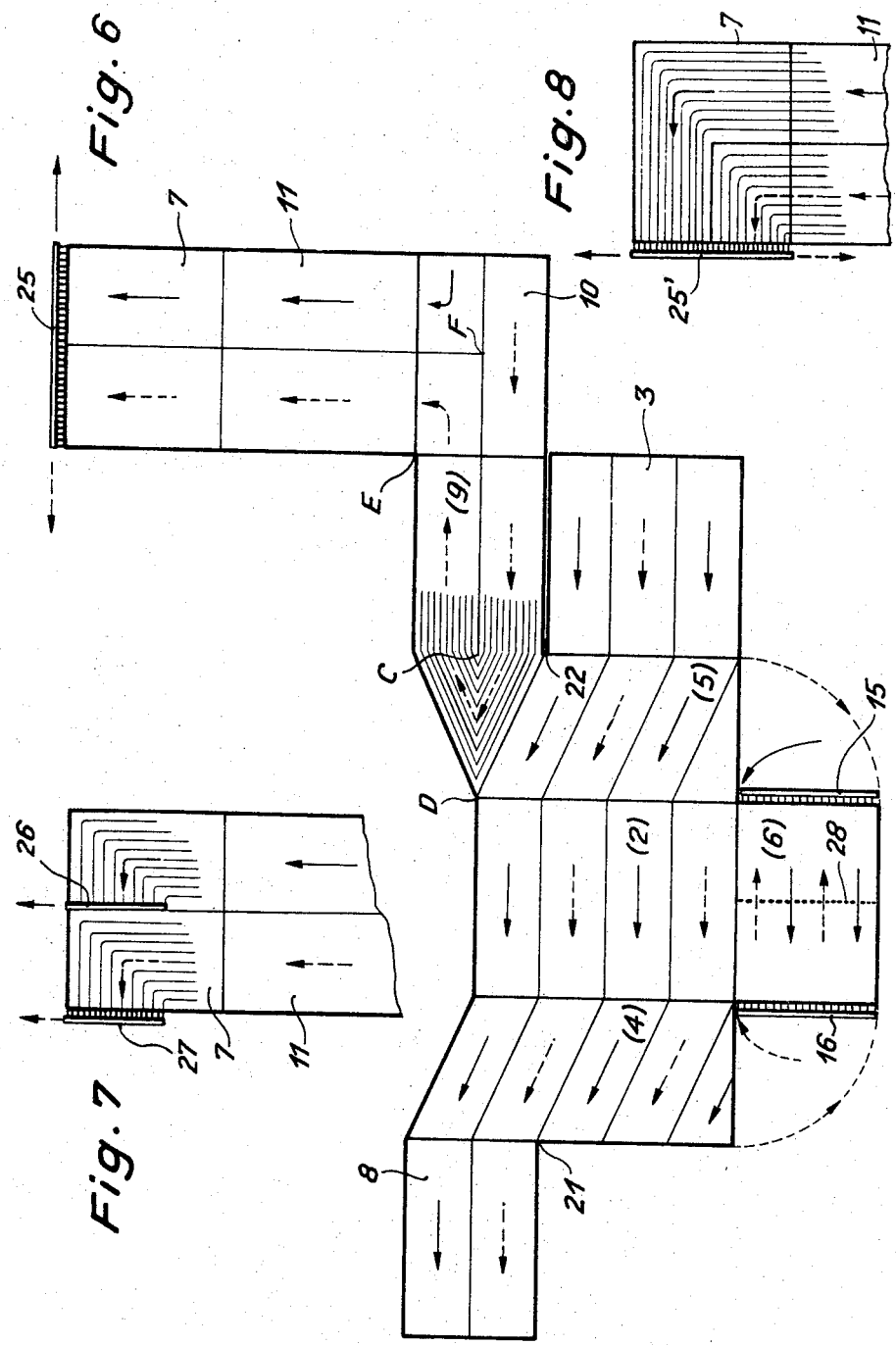

United States Patent Office 3,376,859
Patented Apr. 9, 1968

3,376,859
PIPE LINING FOR A STEAM GENERATOR
Pawel Miszak, Winterthur, Switzerland, assignor to Sulzer Brothers, Limited, Winterthur, Switzerland, a corporation of Switzerland
Filed Sept. 27, 1966, Ser. No. 586,348
Claims priority, application Switzerland, Oct. 5, 1965, 13,751/65
5 Claims. (Cl. 122—235)

This invention relates to a pipe lining for a steam generator. More particularly, this invention relates to a pipe lining for forming the walls and floor of a steam generator.

Generally, steam generators have been provided with pipe linings which have formed the walls of the steam generator. However, the floors of such steam generators either have not been provided with linings or have been provided with complex pipe linings having a large number of elbows.

Accordingly, it is an object of the invention to provide a pipe lining for the walls and floor of a steam generator.

It is another object of the invention to provide a pipe lining for the walls and floor of a steam generator having a minimum number of elbows.

It is another object of the invention to provide a pipe lining for a steam generator formed of two continuous pipe strips.

It is another object of the invention to provide a pipe lining for conducting a working medium across the floor and the walls of a steam generator in a pair of opposed paths.

Generally, the invention provides a steam generator with a lining composed of a pair of pipe strips which are wound about a combustion chamber in a continuous manner to form the floor and the walls of the steam generator. Each pipe strip is formed of a plurality of parallel pipes which are disposed with respect to the pipes of the other pipe strip so that the horizontally disposed pipes of the pipe strips forming the floor of the combustion chamber are arranged in alternating relation. Further, each pipe strip is wound around the walls of the combustion chamber in alternation with the other pipe strip.

Each pipe strip is connected to a working medium supply system so that the working medium in one pipe strip flows counter to the flow of working medium in the other pipe strip in the floor of the steam generator while flowing in the same direction in the walls of the steam generator.

These and other objects and advantages of the invention will become more apparent from the following detailed description and appended claims taken in conjunction with the accompanying drawings in which:

FIG. 1 illustrates a front diagrammatic perspective view of a lining of the invention;

FIG. 2 illustrates a rear diagrammatic perspective view of the lining of FIG. 1;

FIG. 3 illustrates a horizontal section through the plane A of FIG. 1;

FIG. 4 illustrates a vertical section through the plane B of FIG. 1;

FIG. 5 illustrates a view taken on line I—I of FIG. 4;

FIG. 6 illustrates a development of the lining of FIG. 1 showing the interior side of the lining; and FIGS. 7 and 8 illustrate modifications of the exit ends of the linings of the invention.

Referring to FIGS. 1, 2 and 6, a steam generator having a combustion chamber 30 and communicating horizontal smoke gas flue 31 is provided with a lining formed by a pair of pipe strips over the entire surface area. The combustion chamber 30 is formed with a front wall 2, a rear wall 3 opposite the front wall (FIG. 2), a right-hand side wall 4, and left-hand side wall 5. In addition, the combustion chamber 30 includes a floor 6 (FIG. 6) and a ceiling 7. The smoke gas flue 31 is formed with a right-hand side wall 8, a left-hand side wall 9, and a rear wall 10. Also, the smoke gas flue 31 includes a ceiling 11 (FIG. 6).

Referring to FIGS. 3 and 4, the front wall 2 and rear wall 3 of the combustion chamber wall lining are constructed of horizontally disposed pipes 32 and the side walls 4, 5 are constructed of inclined pipes 33. The horizontally disposed pipes 32 and inclined pipes 33 are interconnected to each other at the corners of the combustion chamber 30 in sequential fashion to form a pair of continuously wound strips of parallel pipes. The floor 6 is constructed of two sets of parallel pipes 34, 34' which are parallel to the horizontally disposed pipes 32 of the front and rear walls 2, 3 of the combustion chamber. Each set of parallel pipes 34, 34' of a pipe strip is connected to an inlet manifold 16, 15, respectively, for the supply of working medium thereto.

Referring to FIGS. 2, 3 and 6, a first pipe strip designated by solid drawn arrows in the drawings which is connected to the inlet manifold 15 disposed near the under edge of the left-hand combustion chamber wall 5 begins with the parallel pipes 34' which branch from the manifold 15 to form part of the combustion chamber floor 6. The pipes 34' extend across the floor 6 to the right-hand wall 4 to merge into the lowest run 17 of the inclined pipes 33 (FIG. 3). These inclined pipes 33 extend horizontally from the corner between the right-hand combustion chamber wall 4 and the combustion chamber rear wall 3 to form the bottom run of the combustion chamber rear wall 3. At the next corner, that is, between the combustion chamber rear wall 3 and the left-hand side wall 5, the pipes merge into the inclined pipes of the second run 18 (FIG. 2). Merging into the second run of the horizontal pipes of the combustion chamber front wall 2 takes place at the next corner and so on. The second pipe strip, designated by broken arrows, begins at the inlet manifold 16 with pipes 34 passing through the combustion chamber floor and then merges on the left-hand combustion chamber side wall 5 into the bottom run 19 (FIG. 2) of the inclined pipes which then continue into the bottom run of the horizontal pipes of the combustion chamber front wall 2, and so on. The pipes 34 and 34' forming the combustion chamber floor are so disposed that they alternate, that is, that below the bottom edge of the combustion chamber wall 4 a pipe 34' merges into the inclined pipes 33 of this wall 4 while the next pipe 34 connects with the inlet manifold 16 and so on (FIGS. 3 and 4).

Referring to FIGS. 3 to 5, the inlet manifolds 15 and 16 are disposed lower than the positions at which the pipes of the combustion chamber floor merge into the inclined pipes of the combustion chamber side walls so that the pipes connected to the manifold are downwardly inclined. Consequently, it is possible for the changeovers of the horizontal pipes of the bottom into the inclined pipes of the side walls to be constructed as plane elbows. Pins or connecting webs 20 are welded between the pipes of the walls as well as of the bottom so that the entire wall lining may be constructed in a gas-tight manner.

When the pipe strip designated with the broken arrows extends above the point 21 (FIG. 1) the pipes merge into a horizontal extension and form the bottom run of the right-hand side wall 8 of the horizontal smoke gas flue 31. The pipes then continue to extend horizontally at the corner between the side wall 8 and the rear wall 10 and form the bottom run of the rear wall 10 and then, in the form of horizontal pipes, form the bottom run of the left-hand side wall 9 of the horizontal smoke gas flue. At the position 22 at which the left-hand side wall 9 joins with the left-hand side wall 5 of the combustion chamber (FIG. 2) the pipes extend in an inclined manner, are then bent between points C and D to be inclined in the opposite direction and then merge above the position 22 into the horizontal pipes of the upper run of the side wall 9. In their further extension these pipes cover the right-hand half (FIG. 2) of the upper run of the rear wall 10 while being bent upwards. In their further extension the pipes cover one-half of the smoke gas flue ceiling 11 and of the combustion chamber ceiling 7. The pipe strip indicated by the broken arrows then terminates in the collecting manifold 25. On reaching the horizontal smoke gas flue (below position 22) the pipe strip designated by the solidly drawn arrows initially lines the left-hand side wall 5 of the combustion chamber, the front wall 2 of the combustion chamber and the right-hand side wall 4 of the combustion chamber and only then merges into the lining of the horizontal smoke gas flue where it merges into the upper run of the right-hand side wall 8 of the aforementioned flue. The aforementioned pipe strip lines only the right-hand half of the upper run of the rear wall 10 of the smoke gas flue (left in FIG. 2) and then extends in parallel to the pipe strip indicated by broken arrows into the lining of the second half of the moke gas fllue ceiling 11 and of the combustion chamber ceiling 7. The pipe strip indicated by the solidly drawn arrows also terminates in the collecting manifold 25. Both streams of working medium may remain separated in this manifold or they may be intermixed and if necessary guided to further heating surfaces, for example, platex superheaters and/or pipe bundle superheaters in the convention heated zone or may be guided to the load.

In the embodiment example according to FIGS. 1 to 6, the two pipe strips are of different length because of the reversal of the winding direction of the strip designated with broken arrows in the combustion chamber side wall 5. The pipes of the strip designated with broken arrows are also of different length among themselves. For example, the pipe adjacent to position C (FIGS. 2 and 6) occupies a smaller distance than the external pipe disposed near the position D. This length difference is compensated to a certain extent in the rear wall 10 to which end the external pipe disposed at position D is located on the inside at position E while the pipe disposed on the inside at position C is located on the outside at position F. If a further compensaton of pipe length within this strip is necessary, the pipes of the two strips may be bent once again in the zone of the combustion chamber ceiling 7 in accordance with the embodiment of FIG. 7. Instead of terminating in a collecting manifold 25 disposed in front of the combustion chamber front wall 2, the two pipe strips will then terminate separately in collecting manifolds 26 and 27 which are mounted above the ceiling 7 or adjacent to the side wall 4. Should it also be necessary to compensate for the varying length of the two pipe strips it is possible to adopt the arrangement illustrated in FIG. 8. According to FIG. 8, the two strips in the combustion chamber ceiling 7 are bent at right angles and terminate in a collecting manifold 25' disposed adjacently to the combustion chamber wall 4. It is appropriate in each case to adjust the supply of working medium to the two pipe strips independently of each other.

According to an embodiment example of the invention the combustion chamber 30 surrounded by the wall lining heretofore described is subdivided into two halves of equal size by an intermediate wall which is indicated in FIG. 6 by a dotted line 28. This subdivision causes the longer combustion chamber side in each part combustion chamber to be lined by inclined pipes. This is advantageous because the side under greater thermal loading will then be lined by a more densely spaced pipe system and a certain compensation in the thermal loadings will be obtained between the shorter and longer walls of each part combustion chamber. The intermediate wall may also consist of pipes and may be disposed relative to the pipe strips either in parallel to the working medium side or serially, for example downstream of the pipe strips. The intermediate wall is preferably not made gas tight.

By adopting this construction of the invention of the floor pipes it is possible in a simple manner and therefore with low costs to line the combustion chamber floor with relatively closely spaced pipes which are all of the same length. The floor pipes merge into the inclined pipes of the walls by means of simple bends. Owing to the fact that each second pipe is connected with an inclined pipe a spacing will be obtained between every two pipes to be connected with a working medium supply manifold so that their ends can be readily welded to the manifold. In the arrangement according to the invention the working medium to be supplied to the combustion chamber pipe system initially flows through the bottom pipes, where uniform heating of the working medium before its entry into the wall pipe system takes place over the length of the pipes because of the alternating connection of the pipes with the inclined pipes and with the working medium supply system so that the working medium distribution over the pipes of the combustion chamber walls is rendered uniform.

Having thus described the invention, it is not intended that it be so limited as changes may be readily made therein without departing from the scope of the invention. Accordingly, it is intended that the subject matter described above and shown in the drawings be interpreted as illustrative and not in a limiting sense.

What is claimed is:

1. A lining for a steam generator having a combustion chamber of four side walls and a floor comprising
   a first plurality of parallel pipes disposed horizontally to form two opposite side walls of the combustion chamber,
   a second plurality of parallel pipes disposed angularly to the horizontal in communication with said first plurality of pipes to form the remaining two side walls of the combustion chamber,
   a third plurality of parallel pipes disposed in parallel to said first plurality of pipes to form the floor of the combustion chamber, and
   an inlet manifold at opposite ends of said floor, said pipes of said floor being alternately interconnected at each end to respective angularly disposed pipes of each respective one of said remaining side walls and to a respective inlet manifold.

2. A lining as set forth in claim 1 further comprising webs secured between adjacent pipes of said walls for sealing said combustion chamber.

3. A lining as set forth in claim 1 further comprising an intermediate wall between said remaining side walls dividing the combustion chamber into two parts, each one of said remaining side walls in a respective part being longer than the adjacent side walls of said part.

4. A lining as set forth in claim 1 wherein a pair of pipe strips form said first and second plurality of pipes, each said pipe strip being wound in quadrilateral fashion.

5. A lining as set forth in claim 4 wherein said pipe strips are wound in alternating relation to each other whereby said horizontally disposed pipes of each pipe strip are alternately arranged in relation to said horizontally disposed pipes of the other pipe strip.

References Cited

UNITED STATES PATENTS

| 3,030,937 | 4/1962 | Witzke. | |
| 3,105,466 | 10/1963 | Evans | 122—235 |
| 3,232,282 | 2/1966 | Gfrerer | 122—235 X |

FOREIGN PATENTS

| 1,022,348 | 3/1966 | Great Britain. |

CHARLES J. MYHRE, *Primary Examiner.*